April 13, 1943.　　　H. J. SANG　　　2,316,627
COMPUTING DEVICE
Filed July 12, 1939
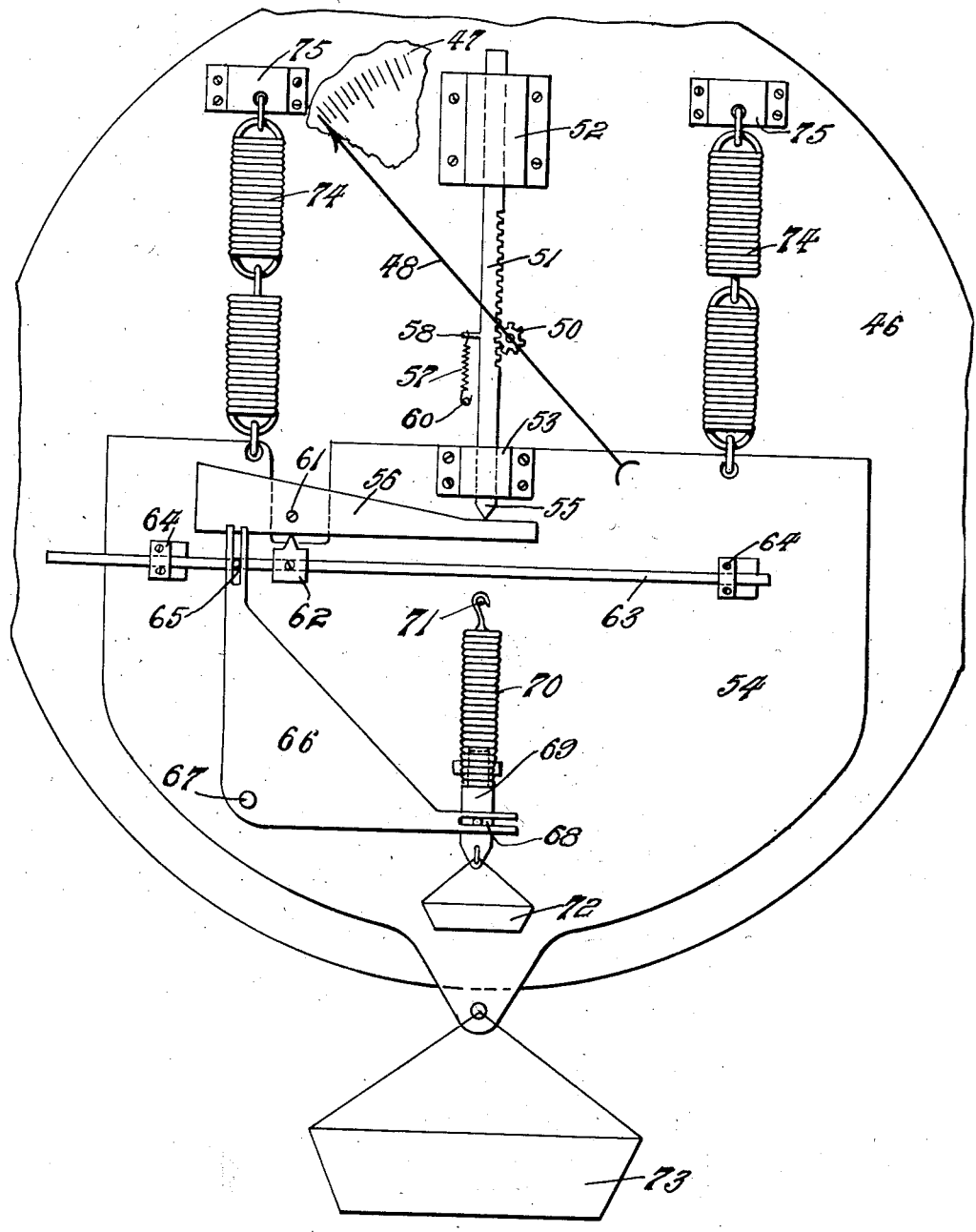
INVENTOR
HENRY J. SANG,
BY
Frank H. Borden
ATTORNEY Patented Apr. 13, 1943

2,316,627

UNITED STATES PATENT OFFICE 2,316,627

COMPUTING DEVICE

Henry J. Sang, Moylan, Pa.

Application July 12, 1939, Serial No. 283,948

2 Claims. (Cl. 265—29)

The present invention relates to computing devices and more particularly to a device responsive to two separate motions one of which is transferred to an indicator through a lever system the ratio of which depends upon the other motion.

Some of the objects of the present invention are to provide an improved motion computing device; to provide a device wherein an indicator is so arranged and operated as to show a reading resulting from the combined action of two applied motions; to provide a computing device responsive to two distinct motions to indicate a composite condition whether both motions are continuous or one continuous and the other intermittent; to provide a device which may serve as a controlling medium for proportioning two separate amounts of motion so that a predetermined resultant average condition is automatically maintained; to provide a device wherein the motions of two variables are so combined and associated with a third motion that the latter is at all times proportional to the ratio between aggregates of the aforesaid two variables.

In the accompanying drawing the figure represents a front elevation of a computing mechanism embodying one form of the present invention.

In the form of the invention shown in the figure, a relatively fixed frame or panel 46 is provided with a scale 47 suitably graduated according to the unit taken as a standard and to indicate the quotient obtained by dividing a draft load by a unit load, these loads respectively causing two relatively normal motions to operate through certain novel mechanism to automatically compute the aforesaid quotient. A hand or index 48 is arranged to travel across the scale 47 as required by the turning of a pinion 50 to which the hand 48 is attached. Motion is transmitted to the pinion 50 by a rack bar 51 which is vertically disposed and guided for straight line motion at one end by a guide member 52 and at the other end by a like guide member 53. The member 52 is fast to the face of the panel 46 while the member 53 is fast to a weighing plate 54. The lower end 55 of the bar 51 is substantially in the form of a knife edge to bear against the upper face of a proportioning lever 56, being normally held thereagainst by a tension spring 57 stretched between a part 58, of the bar 51, and a pin 60 projecting from the panel 46. The lever 56 is pivoted at 61 to the panel 46 and is arranged to bear against a movable fulcrum 62 which automatically shifts according to conditions to vary the effective leverage of the lever 56.

In order to shift the fulcrum 62 it is fastened to a shift rod or carriage 63 guided at opposite ends by fixed bearings 64 and actuated by a pin and slot connection 65 on one arm of a bell crank 66, which is hinged at 67 to the plate 54. The other arm of the bell crank 66 has a pin and slot connection 68 with a follower 69, one end of which is connected to a unit weighing spring 70, which is suspended from a pin 71 attached to the weighing plate or frame 54. The opposite end of the follower suspends a pan 72 for receiving the unit weight.

For producing the second motion normal to the first motion the weighing plate 54 suspends from its lower edge a draft load pan 73 which is in vertical alignment with the unit load pan 72 and operates when loaded to draw the plate 54 downward against the tension of two main weighing springs 74. These springs 74 are connected respectively between anchor elements 75 and the weighing plate 54 and normally suspend the plate 54 in an initial position where the hand 48 indicates a zero or starting position.

Thus it will be seen that as in the previously described forms of the invention there are two motions acting perpendicular to each other one of these being caused by a draft load in the pan 73 drawing the weighing plate or frame 54 downward against the tension of the springs 74, thereby changing the vertical location of the hinge-point 61 of the lever 56, relative to the point of contact of said lever 56 with the movable fulcrum 62, and the other by the unit weight in the pan 72 causing the bell crank 66 to swing about the hinge pivot 67 to thereby shift the fulcrum 62 to such a position as will give a proportionality factor directly related to the motion of the unit load. As a result the movement of the rack bar 51 to its new resultant position causes the pinion 50 to swing the hand 48 to the proper graduation on the scale 47 as will indicate the quotient obtained by dividing the draft load by the unit load.

Having thus described my invention, I claim:

1. A mechanism for computing the relation between the aggregates of two motions acting perpendicular to each other, consisting of a fixed panel, a weighing plate flexibly suspended from said panel, a draft load pan connected to said plate and acting by gravity to move said plate relative to said panel in the first of said two perpendicular motions, indicating means responsive to movement of said plate, a lever pivoted to said panel and coacting with said indicating means, a fulcrum associated with said lever supported on said plate and movable in the second of said two perpendicular motions, and a unit load operated means for shifting said fulcrum whereby said indicating means is actuated as a function of the radio of the draft load to the unit load.

2. A mechanism for computing the relation between the aggregates of two motions acting perpendicular to each other, consisting of a fixed panel, a spring suspended weighing plate hung on said panel, a draft load pan connected to and arranged to move said plate in opposition to said spring action in the first of said two perpendicular motions, indicating means responsive to movement of said plate under a draft load, a lever pivoted to said panel and coacting with said indicating means, a fulcrum associated with said lever and movable relative to said plate in the second of said two perpendicular motions, means including a bell crank for shifting said fulcrum, and unit load means arranged to actuate said bell crank whereby said indicating means is actuated as a function of the ratio of the draft load to the unit load.

HENRY J. SANG.